(12) United States Patent
Furman et al.

(10) Patent No.: US 9,465,776 B2
(45) Date of Patent: Oct. 11, 2016

(54) FILTERING FONTS BASED ON A SELECTION OF GLYPHS

(71) Applicant: Adobe Systems Incorporated, San Jose, CA (US)

(72) Inventors: Vadim Furman, Lake Forest Park, WA (US); Anil Ahuja, Utter Pradesh (IN); Shailja Gupta, Utter Pradesh (IN); Rahul Jain, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 331 days.

(21) Appl. No.: 14/090,807

(22) Filed: Nov. 26, 2013

(65) Prior Publication Data
US 2015/0149895 A1 May 28, 2015

(51) Int. Cl.
*G06F 17/22* (2006.01)
*G06F 17/21* (2006.01)

(52) U.S. Cl.
CPC ................... *G06F 17/214* (2013.01)

(58) Field of Classification Search
CPC .............. G06F 17/214; G06F 17/211; G06F 17/2211; G06F 17/2217; G06F 17/24; G06F 3/0481; G06K 15/1827; G06K 9/6215; G06K 9/6828
See application file for complete search history.

(56) References Cited

U.S. PATENT DOCUMENTS

| | | | | |
|---|---|---|---|---|
| 5,495,577 A | * | 2/1996 | Davis | G06F 17/214 715/238 |
| 5,577,177 A | * | 11/1996 | Collins | G06F 17/214 345/170 |
| 5,586,242 A | | 12/1996 | McQueen, III et al. | |
| 6,288,726 B1 | * | 9/2001 | Ballard | G06F 17/214 345/468 |
| 6,321,243 B1 | * | 11/2001 | Ballard | G06F 17/214 715/202 |
| 6,501,475 B1 | * | 12/2002 | Cheng | G06T 11/203 345/467 |
| 6,512,531 B1 | * | 1/2003 | Gartland | G06F 17/214 345/467 |
| 6,853,980 B1 | * | 2/2005 | Ying | G06Q 30/06 705/26.62 |
| 6,856,317 B2 | | 2/2005 | Konsella et al. | |
| 7,707,497 B1 | | 4/2010 | Patel | |
| 8,331,681 B1 | | 12/2012 | Lorenz et al. | |
| 8,718,369 B1 | * | 5/2014 | Tompkins | G06F 17/30259 382/181 |
| 2005/0034119 A1 | | 2/2005 | Koyama et al. | |
| 2005/0091250 A1 | | 4/2005 | Dunn et al. | |

(Continued)

OTHER PUBLICATIONS

"Typeface," Wikipedia, the free encyclopedia, downloaded from Internet at URL: "http://en.wikipedia.org/wiki/Typeface," on Oct. 8, 2013, 14 pages.

(Continued)

*Primary Examiner* — Wilson Tsui
(74) *Attorney, Agent, or Firm* — Finch & Maloney PLLC

(57) ABSTRACT

Techniques are disclosed for filtering a list of fonts based on the criteria that each font in the resulting filter supports every single glyph in an arbitrary array of glyphs. The array of glyphs may include one or more glyphs and can be, for example, user-defined (e.g., based on a user content selection within a given document, or entries made on a configuration page) and/or defined by a selected digital document or folder system (where only fonts that support all glyphs used within that entire document or folder system are listed). The techniques can be implemented, for instance, in digital content generation/editing systems that allow for a variety of different fonts and glyphs to be used. In any such cases, the system can be configured to allow for viewing a filtered font list, such that each and every glyph of interest is supported by each font presented in the list.

20 Claims, 6 Drawing Sheets

(56) References Cited

U.S. PATENT DOCUMENTS

| | | |
|---|---|---|
| 2005/0107998 A1 | 5/2005 | McLernon et al. |
| 2006/0238539 A1* | 10/2006 | Opstad .................. G06T 11/203 345/469 |
| 2008/0079730 A1* | 4/2008 | Zhang .................. G06F 17/2217 345/468 |
| 2008/0155495 A1 | 6/2008 | Van Wyk et al. |
| 2008/0303822 A1* | 12/2008 | Taylor .................... G06F 17/214 345/467 |
| 2010/0275161 A1* | 10/2010 | DiCamillo ............ G06F 17/211 715/810 |
| 2011/0126191 A1 | 1/2011 | Ketchen et al. |
| 2011/0271180 A1* | 11/2011 | Lee ....................... G06F 17/214 715/269 |
| 2012/0054231 A1 | 3/2012 | Fu et al. |
| 2012/0311473 A1 | 12/2012 | Nolterieke et al. |
| 2013/0232229 A1 | 9/2013 | Firman et al. |
| 2014/0115435 A1 | 4/2014 | Elseth et al. |
| 2015/0097842 A1* | 4/2015 | Kaasila ................ G06K 9/6215 345/471 |

OTHER PUBLICATIONS

"Extensis(TM) SuitcaseFusion(TM) 5 User Guide for Windows", Celartem, Inc., retreived from <http://doc.extensis.com/Suitcase-Fusion-5-User-Guide-Windows.pdf> (2013).

"Font Management in OS X Best Practices Guide", Celartem, Inc, retreived from <http://doc.extensis.com/Font-Management-in-OSX-Best-Practices-Guide.pdf> (2012).

\* cited by examiner

FILTERING FONTS BASED ON A SELECTION OF GLYPHS

FIELD OF THE DISCLOSURE

This disclosure relates to computer-based writing systems, and more particularly, to techniques for identifying fonts that support an arbitrary set of one or more glyphs.

BACKGROUND

In modern day typography, a typeface generally refers to a set of one or more fonts or a so-called font family (e.g., Times New Roman, Courier, Helvetica, and the like). A given typeface defines a similar appearance of the various graphical representations of the characters of that typeface, such that each font of a given typeface has a specific weight, style, condensation, width, slant, italicization, and ornamentation. These individual graphical representations of characters or so-called graphemes are typically referred to as glyphs. So, a character is any unit member used to represent data (e.g., digits, letters, punctuation), whereas a glyph is visual representation of that character defined by a specific font. To this end, a font can be used to present material having a desired look-and-feel. Because access to multiple typefaces has increased with the advent of computers and computer graphics, and the widely accepted parlance commonly used in computer-based desktop publishing applications refers to the selection of "fonts" rather than typeface, font has become synonymous with typeface. However, a font may also refer to one particular style of a given typeface. For example, the typeface Times New Roman encompasses many different fonts, such as Times New Roman regular, Times New Roman Bold, and the like. Each different style (e.g., bold, italic) is considered a separate font of that typeface (e.g., Times New Roman).

DETAILED DESCRIPTION

Figure 1:
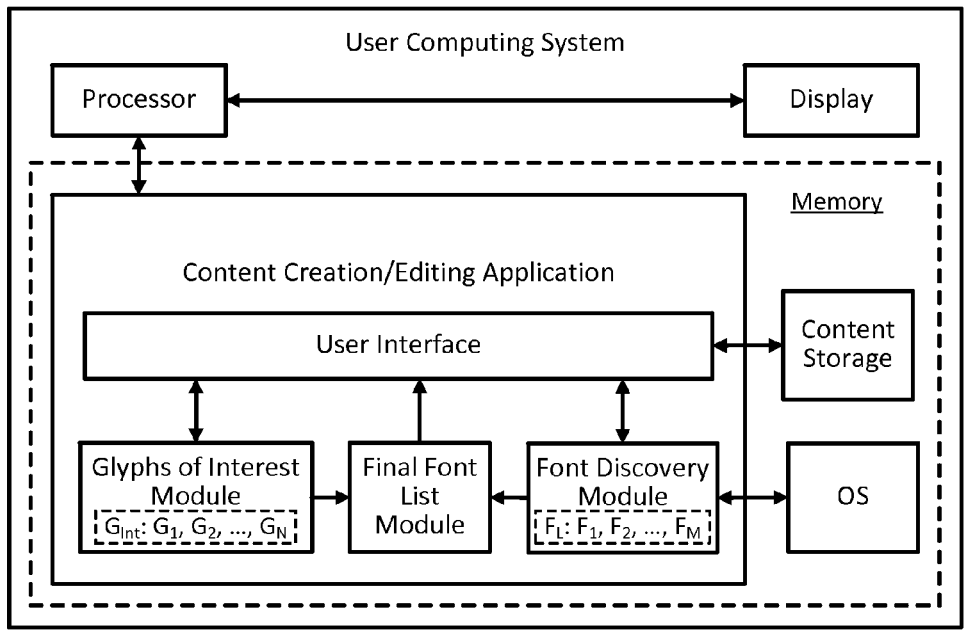
FIG. 1 illustrates a document layout and editing system configured in accordance with an embodiment of the present invention.

Techniques are disclosed for filtering a list of fonts based on the criteria that each font in the resulting filter contains or otherwise supports every single glyph in an arbitrary array of glyphs. The array of glyphs may include one or more glyphs (generally referred to herein as glyphs of interest) and can be, for example, user-defined (e.g., based on a user content selection within a given document, or entries made on a user configuration page) and/or defined by a user selected digital document or folder system of digital documents (e.g., where only fonts that support all the glyphs used within that entire document or folder system are listed). The techniques can be implemented, for instance, in applications used for desktop publishing, word processing, presentations, spreadsheets, email, graphics design and editing, or any other digital content generation and/or editing systems that allow for a variety of different fonts and glyphs to be used. In any such cases, the system can be configured to allow for viewing a list of fonts given a selection or indication of glyphs of interest, such that each and every glyph of interest is supported by each font displayed or otherwise presented in the resulting list.

General Overview

In the context of fonts, a glyph can represent, for instance, a single character or a combined character, such as a+e= Æ. To this end, a glyph is an element of a writing or other layout design feature included in a given digital document and may be an individual mark that presents on a suitable medium (e.g., display) to contribute to the meaning and/or look-and-feel of what is written or otherwise provided in that document. The document may be, for example, a simple text document or an annotated photo or any other rich media document that includes any combination of text, graphics, photos, video, and/or other such digital content. In computing system based applications such as InDesign® and Photoshop® and Illustrator® and After Effects® by Adobe Systems Incorporated, or in word processor applications such as Word by Microsoft Corporation, glyphs can be used for composing text and/or other content elements. However, given a large list of different fonts that such design and word processing applications typically provide, it is not easily apparent which of the available fonts support which glyphs. Nor is it easily apparent which fonts support a specific set of glyphs that is envisioned to be in the content being created. Thus, after applying a font to a piece of text, manual inspection is required to make sure that all glyphs have been re-rendered using the correct font. This is tedious and prone to human error. Another possible work-around to this problem is to warn the user once a given font is applied to a content selection if there are any glyphs in that selection to which the font cannot be applied due to the font not supporting those characters of the selection. While removing human error associated with manual inspection, this process is still tedious and time consuming, as the user must proceed in a trial-and-error fashion (select font, receive warning, try another font, and so on, with each try potentially running into the same problem of the selected font not supporting glyphs of the selection).

Thus, and in accordance with an embodiment of the present invention, techniques are provided herein that allow for filtering a list of fonts based on the criteria that each font in the resulting font list contains or otherwise supports every single glyph in an arbitrary set of glyphs. This set of glyphs may include one or more glyphs and is generally referred to herein as 'glyphs of interest'. At any given time, the glyphs of interest can be, for example, defined by the user based on a selection of content within a given digital document, or based on a list of glyphs specifically selected by the user and independent of any specific document or set of documents. The glyphs of interest may also be defined by, for example, a selected digital document or folder system (or set of documents), wherein only fonts that support all the characters used in that document or document set are listed.

In some embodiments, the techniques are implemented in an application used for word processing, desktop publishing, graphics design and editing, motion graphics, visual effects and compositing, or any other digital content generation and/or editing systems. In any such cases, the system can be configured to allow for viewing a list of fonts given a selection or other indication of glyphs of interest, such that each and every glyph of interest is supported by each font presented in the resulting filtered list of fonts. For instance, the filtered list of fonts can be displayed to the user via a pull-down menu or a pop-up window in response to the user interacting with a user interface so as to indicate a desire to see the various fonts that support the glyphs of interest. Numerous configurations and embodiments will be apparent in light of this disclosure.

As will be further appreciated in light of this disclosure, the techniques effectively remove the human error factor associated with manually assessing applicability of fonts to a given set of glyphs, and increase the speed of design and productivity. A user interface programmed or otherwise configured to present such an automatically filtered font list allows an author or designer or any other user to select fonts with confidence knowing that the list of fonts presented via the user interface is guaranteed to contain the glyphs of interest in the document being created/edited.

System Architecture

FIG. 1 illustrates a document layout and editing system configured in accordance with an embodiment of the present invention. As can be seen, this example system is integrated into a user's computing system, which may be, for example, a desktop or laptop computer, a workstation, a tablet, a smartphone, or other such mobile or stationary computing environment. The computing system generally includes a processor, a display, and a memory. The memory generally includes digital content storage as well as a number of modules executable by the processor, including a content creation/editing application and an operating system (OS). Other componentry and modules typical of a computing system, such as additional processors (e.g., co-processor, graphics processor, etc), input devices (e.g., keyboard, mouse, touch pad, touch screen, etc), and network interface componentry, are not shown but will be apparent in light of this disclosure.

The processor can be implemented with any suitable processor technology and may include a multi-processor scheme as is sometimes done. Likewise, the memory may be implemented with any suitable storage technology including random access and read only memories (RAM and ROM). The display can be any suitable display technology, such as a regular display (e.g., LCD, CRT, etc) or a touch screen display that allows for user input via appropriately placed taps and other gestures. The system may further (or alternatively) include input devices such as a keyboard and mouse that allow the user to interact with the application in the creation/modification of content. As will be appreciated in light of this disclosure, the claimed invention is not intended to be limited to any particular type of processor, memory, display or input devices. In a more general sense, the computing system componentry and architecture on which the application executes, including any peripheral components, can vary greatly from one embodiment to the next, and the techniques provided herein can be used on any such computing systems.

The content creation/editing application may be, for example, any application that allows for a variety of different fonts and glyphs to be used, such as a desktop publishing application (e.g., Adobe® InDesign® or Illustrator®), an image processing application (e.g., Adobe® Photoshop®), a motion graphics, visual effects and compositing application (e.g., Adobe® After Effects®), a word processor application (e.g., Microsoft® Word), a spreadsheet application (e.g., Microsoft® Excel®), a presentation application (e.g., Microsoft® PowerPoint® or Adobe® Presenter), a multimedia application (e.g., Adobe Director), an email application (Microsoft® Outlook®), or a texting or messaging application that offers font selection at the messaging level. The application can be used to access existing content from the local content storage and/or external content such as content found elsewhere on a network with which the system is communicatively coupled (e.g., local area network and/or wide area network such as Internet).

In operation, the user can interact with the application via a user interface to create and/or edit digital content. The user can view the content on the display, and develop and modify that content as desired using the application. For instance, the user may wish to change the look-and-feel of the displayed content, such as a change in font. So, the user can use the user interface of the application to apply a desired one of the available fonts to all or a portion of the content. In addition, and in accordance with an embodiment of the present invention, the application is programmed or otherwise configured to allow the user to filter the available fonts based on previously identified glyphs of interest so that only fonts that include those glyphs of interest are provided as a font choice to the user. In more detail, and with further reference to FIG. 1, the user interface of the application operates in conjunction with a font discovery module, a glyphs of interest module, and a final font list module. The user interface can be programmed or otherwise configured with typical control features that allow the user interact with the application, such as various selectable hierarchal menus and tools for creating and editing digital content files. In addition, the user interface is configured to present a font list to the user wherein every font on that list supports every single glyph included in the glyphs of interest.

In this example embodiment, the font discovery module is configured to access the available fonts from the operating system so as to provide a given set of all available fonts. As can be seen, the font set is generally referred to as font list $F_L$, and includes M fonts ($F_1, F_2, \ldots, F_M$). The font list $F_L$ can then be provided by the font discovery module to the user interface as normally done. In addition, the font list $F_L$ can also be provided by the final font list module, which will be explained in turn.

The glyphs of interest module is configured to allow for identification of glyphs of interest. As can be seen, the glyphs of interest set is generally referred to as $G_{Int}$, and includes N glyphs ($G_1, G_2, \ldots, G_N$). The glyphs of interest can be identified in a number of ways by the glyphs of interest module. In one example scenario, the glyphs of interest can be identified based on a user selection of content within a given document that is opened in the user interface of the application. The selection can be made by the user, for example, by double clicking that section (e.g., double clicking a paragraph effectively selects or 'highlights' that paragraph in many content creation/editing systems). Alternatively, the user selection can be made by performing a click-hold-and-drag gesture (assuming a mouse or trackpad input device) that starts at the beginning of the content to be selected and is released at the end of that section. With respect to touch screen technology, the user selection can be similarly made by performing a tap-hold-and-drag gesture over the content to be selected. Alternatively, some touch screen devices include a so-called handle-based selection mechanism that is manifested when the user performs an elongated press on the touchscreen. In such embodiments, once the handle-based control feature is present on the screen, the user can manipulate the handles to make a specific selection of content. In still other embodiments, the glyphs of interest can be identified based on a user selection of a document or set of documents, wherein the entire document(s) is considered the selection (as opposed to a selection within a given document). In any such cases, once the content selection is made, whether it be a portion within a document, an entire document or a set of documents, the glyphs of interest module is configured to parse that selection and identify each glyph therein and add it to the glyphs of interest set $G_{Int}$. In still other embodiments, the glyphs of interest can also (or alternatively) be identified based on a list of glyphs specifically selected by the user and independent of any specific document or set of documents. In such cases, the glyphs of interest module is configured to effectively provide a menu of possible glyphs and the user can individually select (or deselect, as the case may be) those glyphs to define the glyphs of interest set $G_{Int}$. The glyphs of interest set $G_{Int}$ can then be provided by the final font list module.

The final font list module of this example embodiment is configured to receive the font list $F_L$ and the glyphs of interest set $G_{Int}$, and to filter the font list $F_L$ or otherwise generate a final font list that is based on the glyphs of interest. For instance, and in accordance with one embodiment, for each font in the list of installed fonts $F_L$ provided by the font discovery module, the final font list module is configured to check if that font supports each glyph in the glyphs of interest set $G_{Int}$. If each glyph in the glyphs of interest set $G_{Int}$ is supported by that font, the final font list module is further configured to add that font to the final list of fonts. Once this process has completed for each font in the list of installed fonts $F_L$, the final list of fonts can be displayed in the user interface. Further details of the glyph-based font filtering functionality of the creation/editing application, as well as the user interface, will be discussed in turn with reference to FIGS. 3 through 7b.

Figure 2:
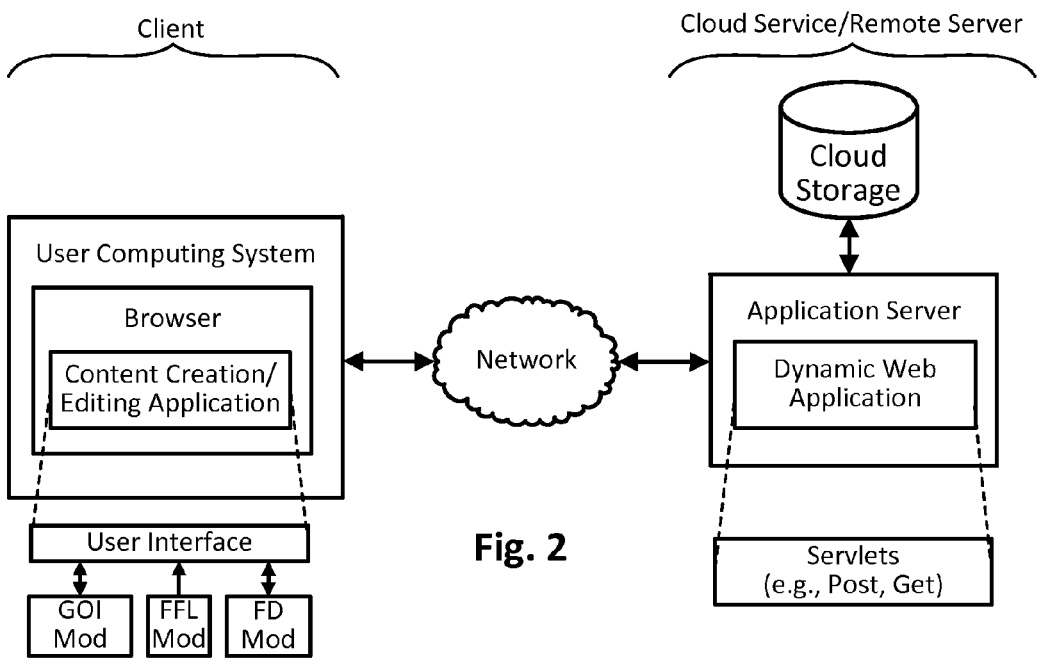
FIG. 2 illustrates a document layout and editing system configured in accordance with another embodiment of the present invention.

FIG. 2 illustrates a cloud-based content creation/editing system configured in accordance with an embodiment of the present invention. As can be seen, the system includes a dynamic web application executable on an application server and programmed or otherwise configured to interact with a client that is communicatively coupled to the application server via a network, and to provide a content creation/editing application to the user of the client. The client includes a user computing system having a processor, memory and other typical components and circuitry as discussed with reference to the computing system of FIG. 1, and a browser application that can be used to access via the network the content creation/editing application and resources of the application server (including a database generally referred to as cloud storage).

As can be further seen in FIG. 2, the user interface as well as the font discovery module (FD Mod), glyphs of interest module (GOI Mod), and the final font list module (FFL Mod) are integrated with or otherwise operate in conjunction with the content creation/editing application to provide glyph-based font filtering functionality as variously described herein. As previously indicated, further details of the glyph-based font filtering functionality of the creation/editing application, as well as the user interface, will be discussed in turn with reference to FIGS. 3 through 7b.

Requested content may be provided in complete page form including any number of components, or a partial page such as one component of a given page. To this end, the dynamic web application may include various functional modules to provision content to, and receive content from, the browser in response to client requests as will be appreciated, such as a post-servlet module that is configured to process Post requests and post the related content to the cloud storage, a get-servlet module (for processing Get requests and retrieving content from the cloud storage), and other modules typically used in provisioning application functionality and content by a server to a remote client. In one example embodiment, pages served by the application server in response to requests from the client include one or more renderable components as well as instructions/code generally referred to herein as the content creation/editing application that is executable in the client browser (e.g., JavaScript applet or other suitable code).

Such a client-server arrangement may be suitable, for example, for any online content creation/editing service (e.g., cloud-based desktop publishing design and editing tools and applications), or any other network-based system where it is desirable to allow a client to have access to a filtered font list that lists fonts known to support certain glyphs. Note that the degree of client-side functionality and server-side functionality can vary from one embodiment to the next, and some embodiments may include features of both a local desktop system and a cloud-based system or service. For instance, the content creation/editing application can be installed locally at the client and still have access to the cloud-based storage (e.g., where the user interface of the application allows a user to access both local content as well as remote content via a network connection), thereby allowing for content sharing, collaboration on projects, and/or remote storage. Numerous configurations and variations on the depicted arrangement will be apparent in light of this disclosure.

The network can be any communications network, such as a user's local area network and/or the Internet, or any other public and/or private communication network (e.g., local and/or wide area network of a company, etc). The user's computing system (client) can be implemented with any suitable computing device, such as a laptop, desktop, tablet, smartphone, or other suitable computing device capable of accessing a server via a network and displaying content to a user. The computing system may employ any number of suitable user input mechanisms, such as a mouse, keyboard, touch screen, trackpad, voice-activated command interface, or any combination thereof. The browser application can be implemented using any number of known or proprietary browsers or comparable technology that facilitates retrieving, presenting, and traversing information resources on a network, such as the Internet, and which allows for the execution of page-embedded code such as a page editing system including the content creation/editing application. The database can be, for example, a Java content repository (JCR) or any other suitable storage facility accessible to the server.

As will be further appreciated in light of this disclosure, the various modules and components of the client-server system shown in FIG. 2, such as the glyphs of interest module, final font list module, font discovery module, and servlet modules, can be implemented in software, such as a set of instructions (e.g., C, C++, object-oriented C, JavaScript, Java, BASIC, etc) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used. In one specific embodiment, each of the font discovery module (FD Mod), glyphs of interest module (GOI Mod), and the final font list module (FFL Mod) of the application is implemented with JavaScript or other downloadable code that can be provisioned in real-time to a client requesting access to the application server, and the servlets are implemented with Java or C++. Numerous other specific configurations can be used, as will be apparent in light of this disclosure.

Methodology and User Interface

Figure 3:
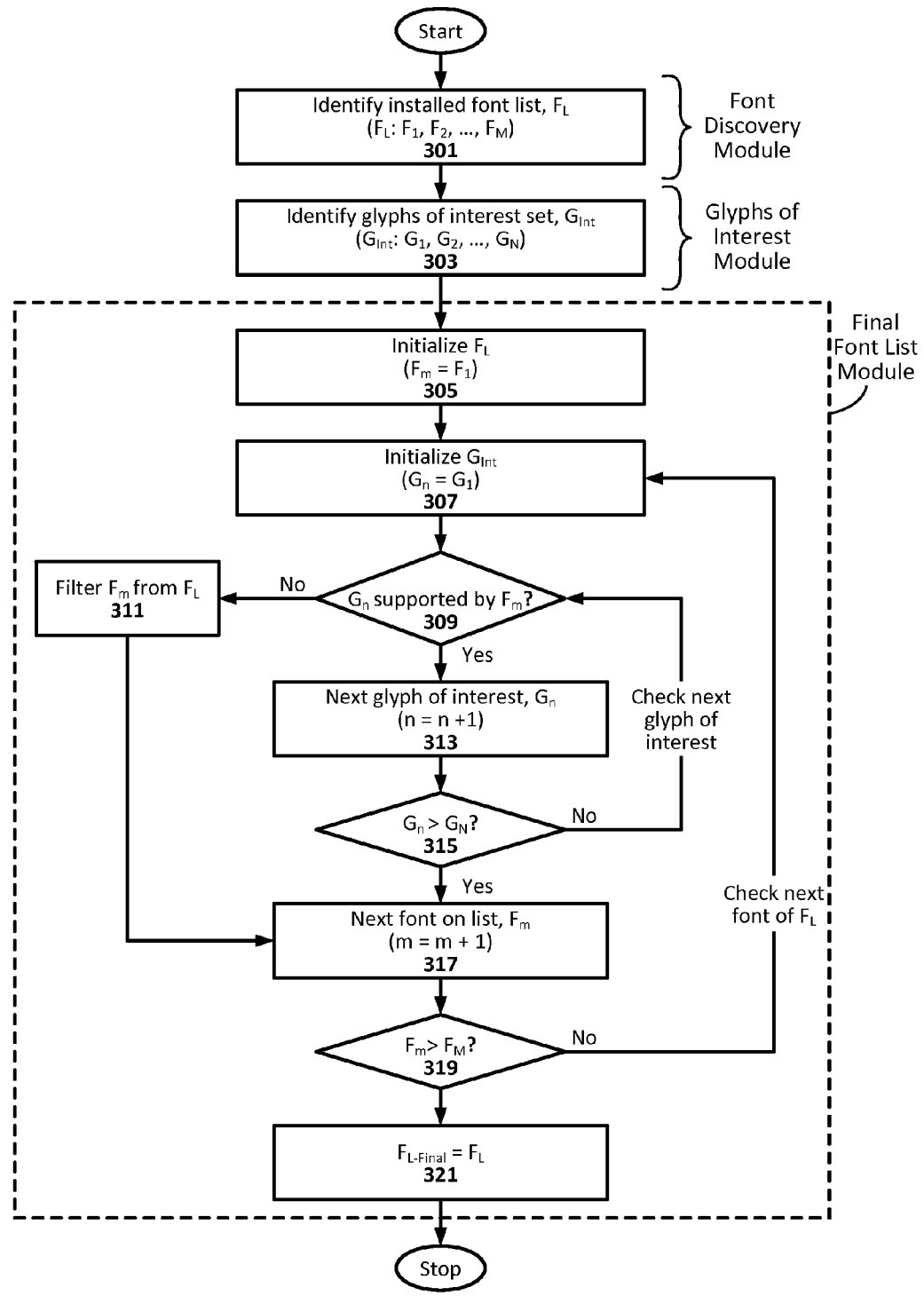
FIG. 3 illustrates a method for identifying fonts that support an arbitrary set of one or more glyphs, in accordance with an embodiment of the present invention.

FIG. 3 illustrates a method for identifying fonts that support an arbitrary set of one or more glyphs, in accordance with an embodiment of the present invention. As can be seen, the method can be carried out, for example, by the font discovery module, glyphs of interest module, and final font list module, which may be implemented as part of a content creation/editing application. The application can be, for example, installed locally on a given computing system or provided as part of a cloud-based service, or some hybrid thereof as previously explained. The previous discussion with respect to example applications is equally applicable here, as will be appreciated.

The method begins with identifying 301 a list of installed fonts list, which can be carried out by the font discovery module. In some embodiments, the available fonts are accessible via the operating system of the user's computing system, although other embodiments may access available fonts from any source or set of sources, including any fonts provided with the various applications installed on or otherwise accessible to the computing system. In any such cases, the methodology including combing the computing system for available fonts and compiling those fonts into a list. As can be seen, the font list $F_L$ of this example includes M fonts ($F_1, F_2, \ldots, F_M$). The font list $F_L$ is now available for filtering and can also be provided to the user interface, so that it can in turn be presented to the user when the appropriate interface control features are selected.

Figure 6A:
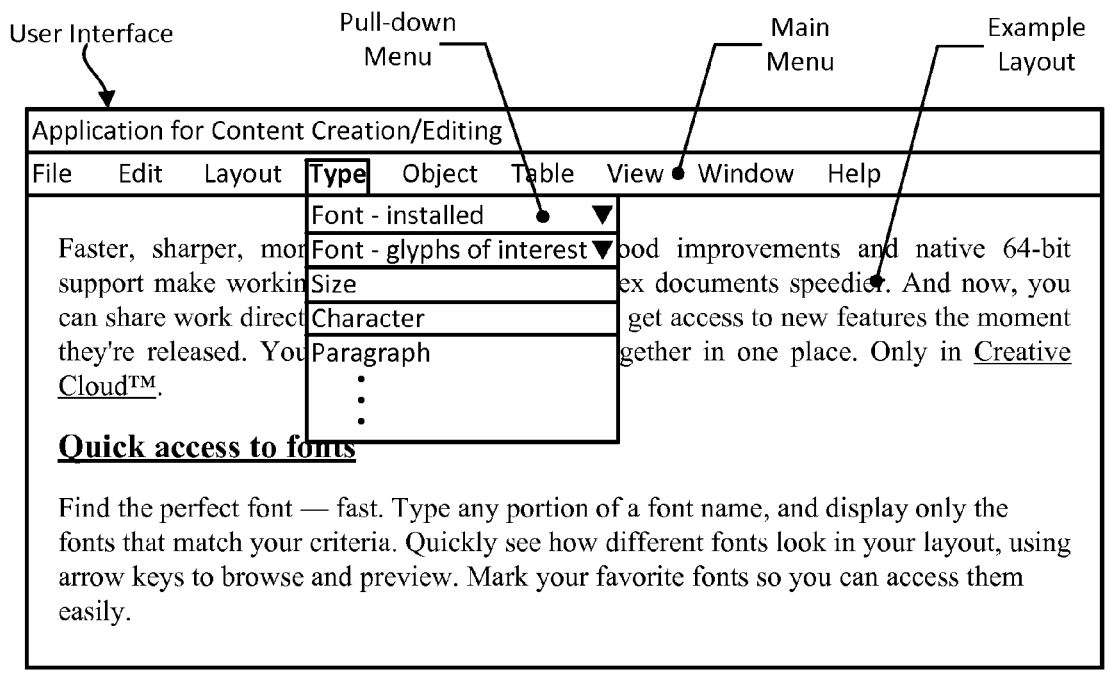
FIG. 6a-c' each illustrates aspects of a user interface of a system for identifying fonts that support an arbitrary set of one or more glyphs, in accordance with an embodiment of the present invention.
Figure 6B:
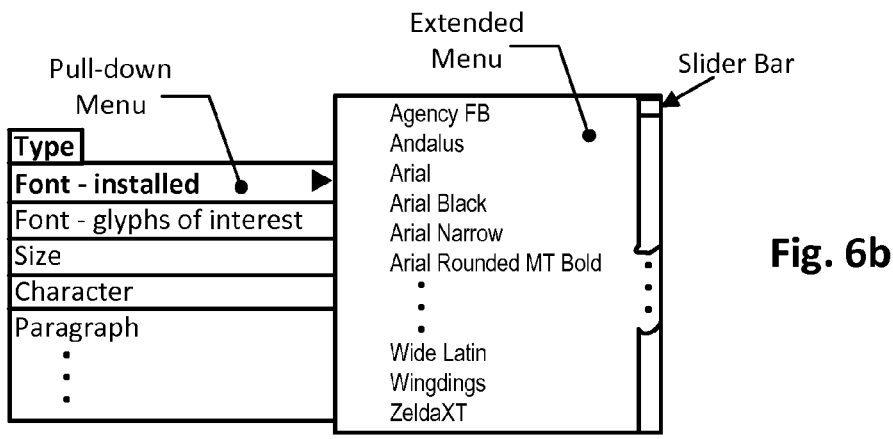

FIG. 6a illustrates an example user interface (UI) for a content creation/editing application. As can be seen, the UI includes a viewing panel where an example layout of digital content can be displayed to the user. The UI further includes other typical features, including a main menu that has a number of sub-menu options that can be selected, including File, Edit, Layout, Type, Object, Table, View, Window, and Help. In this example case, the Type sub-menu can be selected to reveal a number of type-based options that can be further selected, including the option of 'Font—installed.' Selecting this option causes an extended menu to appear, as shown in FIG. 6b. As can be seen, the extended menu includes the list of installed fonts provided at 301. The extended menu may also include other features, such as a scroll or slider bar, should the font list $F_L$ be too long to display all at once. In addition, note that each font can be presented in the list in the corresponding font, so as to provide the user a visual as to the font appearance. In any case, a user can select a given one of the available fonts to apply that font to a given selection of content. The content to which the chosen font is to be applied can be selected with any number of suitable content selections techniques, including those variously described herein.

Figure 4:
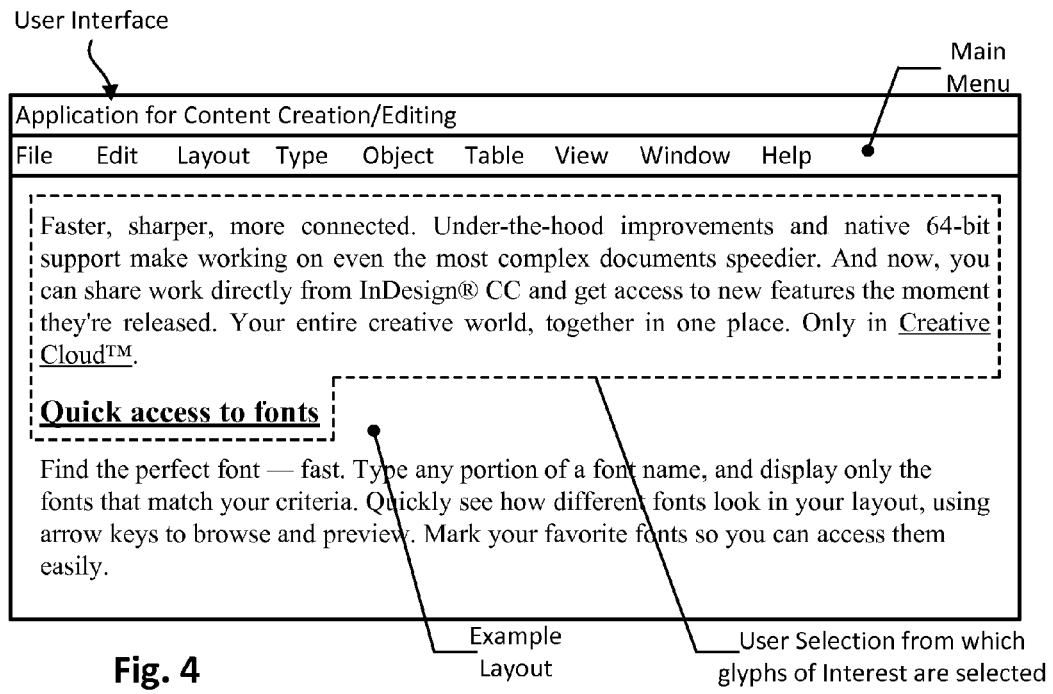
FIG. 4 illustrates a user interface showing one example way for a user to identify glyphs of interest, in accordance with an embodiment of the present invention.
Figure 5:
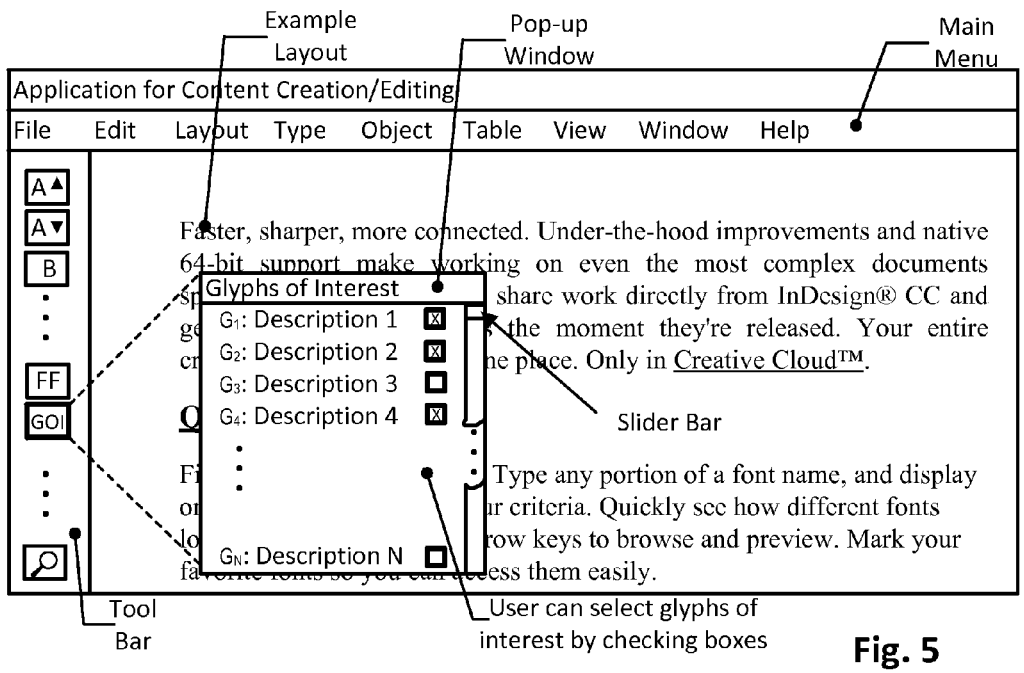
FIG. 5 illustrates a user interface showing another example way for a user to identify glyphs of interest, in accordance with an embodiment of the present invention.

With further reference to FIG. 3, the method continues with identifying 303 the glyphs of interest set, $G_{Int}$ ($G_{Int}$: $G_1$, $G_2, \ldots, G_N$), which can be carried out by the glyphs of interest module in this example embodiment. In one example scenario, the glyphs of interest can be identified based on a user selection of content within a given document that is opened in the user interface of the application, such as shown in FIG. 4. The selection is generally depicted with the dashed line in this example case, but other cases may include highlighting or a color change. Any number of user input actions can be carried out to make that selection as previously explained (e.g., double clicking action on a section of content, click-hold-and-drag gesture, tap-hold-and-drag gesture, handle-based selection mechanism, or other suitable content selection mechanism). In any such cases, once the content selection is made, whether it be a portion within a document, an entire document or a set of documents, that selection can be parsed or otherwise analyzed to identify each glyph therein and add it to the glyphs of interest set $G_{Int}$. In still other embodiments, the glyphs of interest can also (or alternatively) be identified based on a list of glyphs specifically selected by the user and independent of any specific document or set of documents, as shown in FIG. 5. In this example case, for instance, the user interface further includes a tool bar that includes a number of user-selectable icons for activating tools, functions, and configuration menus, one of which is a glyphs of interest (GOI) icon. Once this icon selected by the user (e.g., via a click or screen tap), the methodology underlying the user interface shown in FIG. 5 is configured to provide a pop-up window that includes a list of available glyphs of interest. Once presented with this pop-up, the user can individually select (or deselect, as the case may be) those glyphs to define the glyphs of interest set $G_{Int}$. In some such embodiments, a brief description and/or depiction of each glyph can be provided in the list to assist the user in making selections. A scroll or slider bar can be provisioned if the list is too long to be viewed all at once.

Once the font list $F_L$ and glyphs of interest set $G_{Int}$ are available, the method continues with filtering the font list accordingly, which can be carried out by the final font list module in this example case. In more detail, the method continues with initializing 305 the pointer for $F_L$ ($F_m=F_1$) and initializing 307 the pointer for $G_{Int}$ ($G_n=G_1$). Then, the method proceeds with determining 309 if the current glyph of interest, $G_n$, is supported by the current font, $F_m$. If so, then the method continues at 313 with incrementing the pointer (n=n+1) to the next glyph of interest, G. At this point a determination is made at 315 as to whether there is another glyph to process in the glyph of interest set. So, if the pointer value $G_n$ is not greater than $G_N$ (the pointer value associated with the last glyph in the set), then the next glyph in the set can be processed and the process from 309 on is repeated. Otherwise, the next font on the font list $F_L$ can be processed, as will be discussed in turn.

If, on the other hand, the current glyph of interest, $G_n$, is not supported by the current font, $F_m$, the method continues with excluding, removing, or otherwise filtering 311 that font $F_m$ from the final font list $F_L$. Then, the method continues at 317 with incrementing the pointer (m=m+1) to the next font on the list, $F_m$. At this point a determination is made at 319 as to whether there is another font to process on the font list. So, if the pointer value $F_m$ is not greater than $F_M$ (the pointer value associated with the last font on the list), then the next font on the list can be processed and the process from 307 on is repeated. Otherwise, the final font list $F_{L\text{-}Final}$ is set equal to $F_L$ as adjusted by the filtering process. The final filtered font list can be presented and accessed in any number of ways.

Figure 6C:
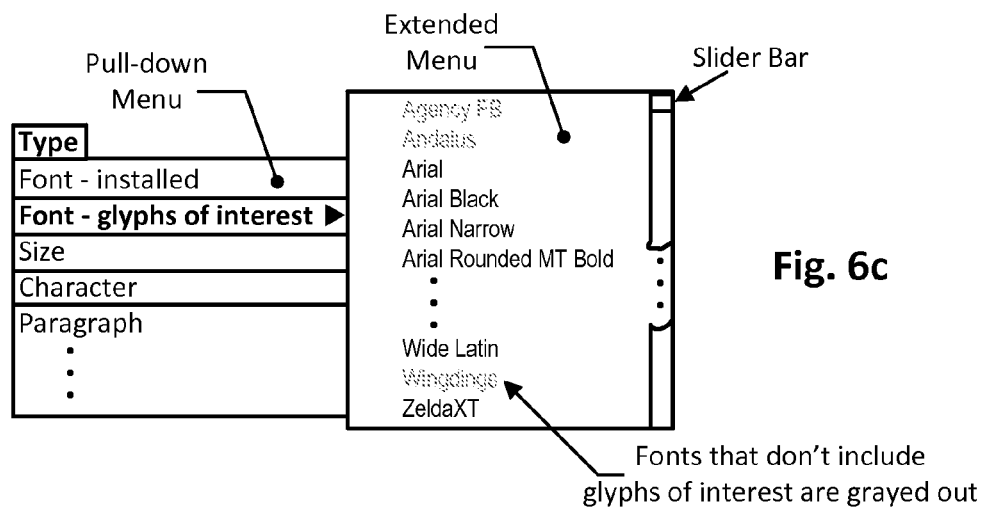
Figure 6C:
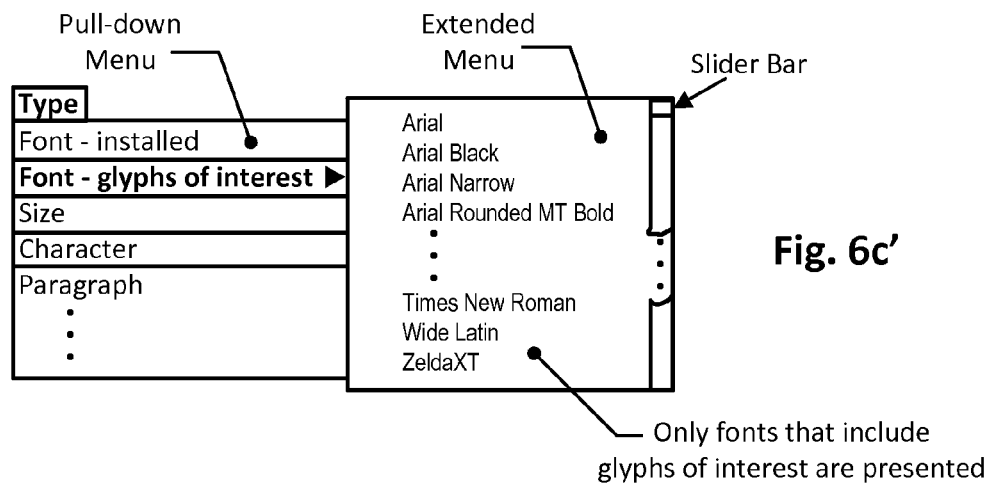

For instance, and as previously explained with reference to FIG. 6a, the Type sub-menu can be selected to reveal a number of type-based options that can be further selected. As can be further seen, another one of these options that can be selected is the option of 'Font—glyphs of interest.' Selecting this option causes an extended menu to appear, as shown in FIG. 6c. As can be seen, the extended menu includes the filtered font list provided at 321. In the example of FIG. 6c, the list presented to the user shows all the fonts that include each and every glyph of interest in a selectable fashion, and any font that doesn't include each and every glyph of interest is shown in an unselectable fashion (e.g., grayed-out or otherwise diminished from view so as to indicate unselectability). In the example of FIG. 6c', the list presented to the user shows only fonts that include each and every glyph of interest. As previously indicated, the extended menu may also include other features, such as a scroll or slider bar, should the filtered font list $F_L$ be too long to display all at once. In addition, note that each font can be presented in the list in the corresponding font, so as to provide the user a visual as to the font appearance. In any case, a user can select a given one of the fonts from the final font list to apply that particular font to a given selection of content included within the document or even an entire document or a set of documents, as previously explained.

Figure 7A:
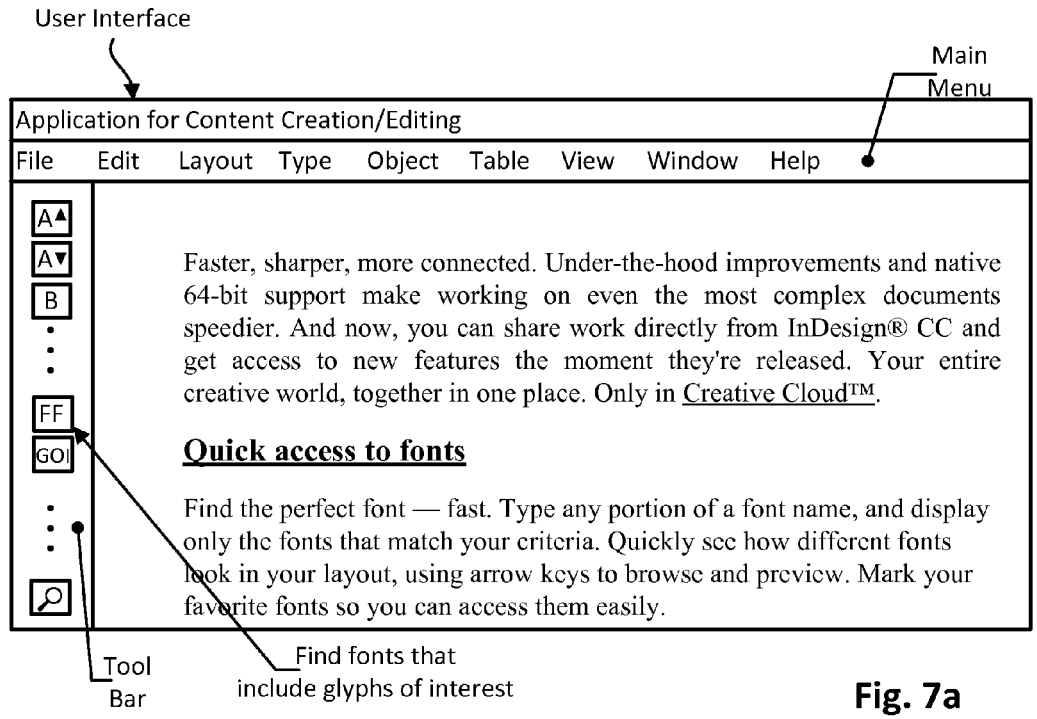
FIG. 7a-b each illustrates aspects of a user interface of a system for identifying fonts that support an arbitrary set of one or more glyphs, in accordance with another embodiment of the present invention.
Figure 7B:
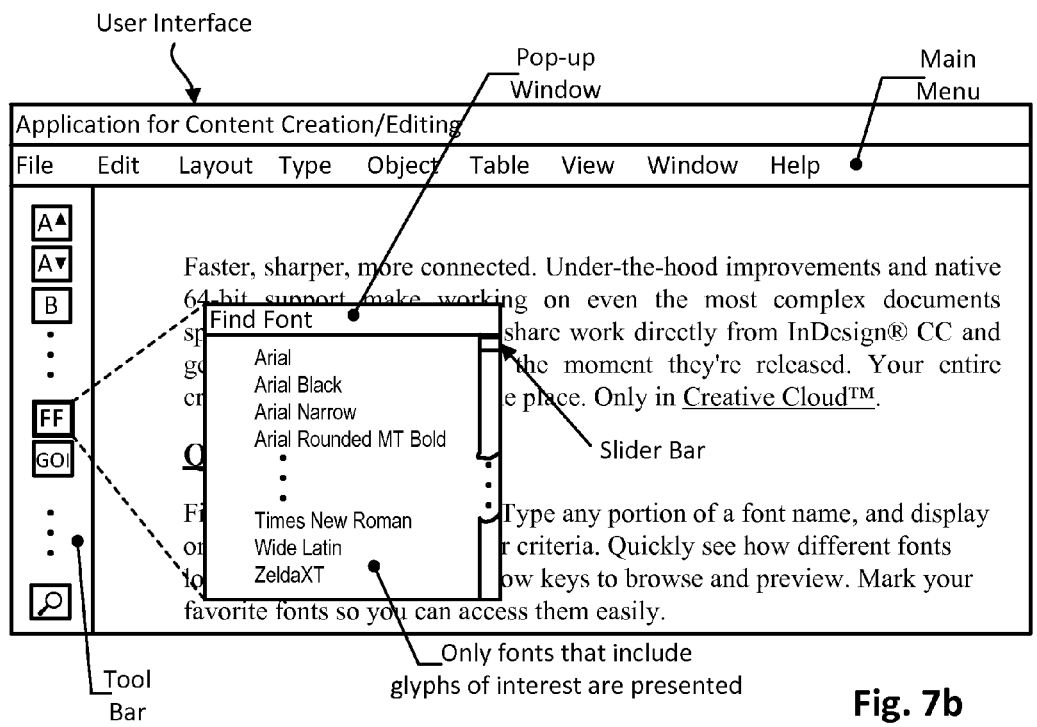

FIG. 7a-b illustrate another example way a user can apply one of the filtered fonts to a given content selection or an entire document or document set (e.g., folder system), in accordance with embodiment of the present invention. As can be seen in this example case, the user interface further includes a tool bar that includes a number of user-selectable icons as previously explained, one of which is a filtered fonts (FF) icon. Once this icon selected by the user (e.g., via a click or screen tap), the methodology underlying the user interface shown in FIG. 7a-b is configured to provide a pop-up window that includes the filtered font list provided at 321. In some such embodiments, a brief description and/or depiction of each glyph can be provided in the list to assist the user in making selections. A scroll or slider bar can be provisioned if the list is too long to be viewed all at once. Once presented with this pop-up, the user can select one of the fonts from the final font list to apply that particular font to a given selection of content included within the document or even an entire document or set of documents, as previously explained.

Numerous embodiments will be apparent, and features described herein can be combined in any number of configurations. One example embodiment of the present invention provides a computer implemented method. The method includes filtering, via a computing system, a plurality of fonts to provide a final font list that only includes fonts that include each and every glyph in a set of glyphs of interest. The method further includes presenting, via a user interface of the computing system, the filtered font list for user selection. In some cases, prior to the filtering, the method further includes identifying the plurality of fonts, and identifying the set of glyphs of interest. In some cases, the set of glyphs of interest is defined by a user selection of digital content displayed on the computing system. In some such cases, the user selection of digital content is a portion of a digital document. In other such cases, the user selection of digital content is one or more digital documents. In some cases, the set of glyphs of interest is defined by a user selection of glyphs that is made independent of digital content. In some such cases, the user selection of glyphs is achieved via the user interface. Variations will be apparent in light of this disclosure. For instance, another embodiment provides a content creation/editing application capable of carrying out the method as variously defined in this paragraph. In one such case, the application is installed locally on the computing system. In another such case, the application is provided as part of a cloud-based service.

Another embodiment of the present invention provides a system. The system includes a processor and a number of executable modules. In particular, the system includes a final font list module executable by the processor and configured to filter a plurality of fonts to provide a final font list that only includes fonts that include each and every glyph in a set of glyphs of interest. The system further includes a user interface configured to present the filtered font list for user selection. In some cases, the system includes a font discovery module executable by the processor and configured to identify the plurality of fonts, and a glyphs of interest module executable by the processor and configured to identify the set of glyphs of interest. In some cases, the set of glyphs of interest is defined by a user selection of digital content presented on a display of the system. In one such case, the user selection of digital content is a portion of a digital document. In other cases, the set of glyphs of interest is defined by a user selection of glyphs that is made independent of digital content (such as a UI that allows the user to directly designate specific glyphs of interest). In some cases, the final font list module and the user interface are part of a content creation/editing application.

Another embodiment provides computer program product including instructions encoded on a non-transient medium that when executed by one or more processors causes a process to be carried out. The process includes filter a plurality of fonts to provide a final font list that only includes fonts that include each and every glyph in a set of glyphs of interest, and present the filtered font list for user selection. In some cases, prior to the filtering, the process further includes identify the plurality of fonts, and identify the set of glyphs of interest. In some cases, the set of glyphs of interest is defined by a user selection of digital content displayed on the computing system. In other cases, the set of glyphs of interest is defined by a user selection of glyphs that is made independent of digital content.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A computer implemented method, comprising:
displaying digital content comprising a plurality of characters displayed as glyphs;
receiving, via a user interface provided by a computing system, a selection of one or more of the plurality of characters, wherein each of the selected characters can be rendered as a corresponding glyph, such that the selection corresponds to selection of one or more glyphs of interest from amongst the displayed glyphs;

identifying, from a set of available fonts provided by the computing system, a first subset of available fonts that contain each of the one or more glyphs of interest, and a second subset of available fonts that do not contain each of the one or more glyphs of interest;

generating a filtered list of the set of available fonts, wherein the filtered list includes the first subset of available fonts but excludes the second subset of available fonts;

displaying the filtered list for user selection of a desired font from the filtered list; and applying the desired font to the digital content when a selection from the filtered list is received.

2. The method of claim 1, further comprising receiving user input identifying the set of available fonts before identifying the first and second subsets of available fonts.

3. The method of claim 1, wherein the selection of one or more of the plurality of characters is received via a text highlighting operation.

4. The method of claim 1, wherein the selection of one or more of the plurality of characters is a selection of at least a portion of a digital document.

5. The method of claim 1, wherein the displayed digital content is a list of characters.

6. A non-transitory computer readable medium storing a content creation/editing application that, when executed by one or more processors, causes the method of claim 1 to be performed.

7. A non-transitory computer readable medium storing a content creation/editing application that, when executed by one or more processors, causes the method of claim 1 to be performed, wherein the application is installed locally on the computing system.

8. A non-transitory computer readable medium storing a content creation/editing application that, when executed by one or more processors, causes the method of claim 1 to be performed, wherein the application is provided as part of a cloud-based service.

9. A system comprising:
a display;
a memory device; and
a processor that is operatively coupled to the display and the memory device, wherein the processor is configured to execute instructions stored in the memory device that, when executed, cause the processor to invoke a font filtering process that comprises:
   displaying, on the display, digital content comprising a plurality of characters displayed as glyphs;
   receiving, via a user interface rendered on the display, a selection of one or more of the plurality of characters, wherein each of the selected characters can be rendered as a corresponding glyph, such that the selection corresponds to selection of one or more glyphs of interest from amongst the displayed glyphs;
   identifying, from a set of available fonts stored in the memory device, a first subset of available fonts that contain each of the one or more glyphs of interest, and a second subset of available fonts that do not contain each of the one or more glyphs of interest;
   generating a filtered list of the set of available fonts, wherein the filtered list includes the first subset of available fonts but excludes the second subset of available fonts;
   displaying, on the display, the filtered list for user selection of a desired font from the filtered list; and
   applying the desired font to the digital content when a selection from the filtered list is received.

10. The system of claim 9, wherein the font filtering process further comprises receiving user input identifying the set of available fonts before identifying the first and second subsets of available fonts.

11. The system of claim 9, wherein the selection of one or more of the plurality of characters is received via a text highlighting operation.

12. The system of claim 9, wherein the selection of one or more of the plurality of characters is a selection of at least a portion of a digital document.

13. The system of claim 9, wherein the displayed digital content is a list of characters.

14. The system of claim 9, wherein the instructions are part of a content creation/editing application.

15. A computer program product comprising a non-transitory computer readable medium storing instructions that, when executed by one or more processors, causes a font filtering process to be carried out, the process comprising:
   displaying digital content comprising a plurality of characters displayed as glyphs;
   receiving, via a user interface provided by a computing system, a selection of one or more of the plurality of characters, wherein each of the selected characters can be rendered as a corresponding glyph, such that the selection corresponds to selection of one or more glyphs of interest from amongst the displayed glyphs;
   identifying, from a set of available fonts provided by the computing system, a first subset of available fonts that contain each of the one or more glyphs of interest, and a second subset of available fonts that do not contain each of the one or more glyphs of interest;
   generating a filtered list of the set of available fonts, wherein the filtered list includes the first subset of available fonts but excludes the second subset of available fonts;
   displaying the filtered list for user selection of a desired font from the filtered list; and
   applying the desired font to the digital content when a selection from the filtered list is received.

16. The computer program product of claim 15, wherein the process further comprises receiving user input identifying the set of available fonts before identifying the first and second subsets of available fonts.

17. The computer program product of claim 15, wherein the selection of one or more of the plurality of characters is received via a text highlighting operation.

18. The computer program product of claim 15, wherein the displayed digital content is a list of characters.

19. The computer program product of claim 15, wherein the selection of one or more of the plurality of characters is a user selection made from a character list.

20. The computer program product of claim 15, wherein the selection of one or more of the plurality of characters is a selection of at least a portion of a digital document.

* * * * *